United States Patent
Singhal

Patent Number: 6,163,782
Date of Patent: Dec. 19, 2000

[54] EFFICIENT AND EFFECTIVE DISTRIBUTED INFORMATION MANAGEMENT

[75] Inventor: Amitabh Kumar Singhal, Basking Ridge, N.J.

[73] Assignee: AT&T Corp., New York, N.Y.

[21] Appl. No.: 09/079,073

[22] Filed: May 14, 1998

Related U.S. Application Data

[60] Provisional application No. 60/066,111, Nov. 19, 1997.

[51] Int. Cl.⁷ .................................................. G06F 17/30
[52] U.S. Cl. ................... 707/104; 707/3; 707/10
[58] Field of Search ................. 707/2, 3, 5, 10, 707/104, 200

[56] References Cited

U.S. PATENT DOCUMENTS

| | | | |
|---|---|---|---|
| 4,956,774 | 9/1990 | Shibamiya et al. | 707/2 |
| 5,091,852 | 2/1992 | Tsuchida et al. | 707/2 |
| 5,265,244 | 11/1993 | Ghosh et al. | 707/1 |
| 5,544,352 | 8/1996 | Egger | 707/5 |
| 5,642,502 | 6/1997 | Driscoll | 707/5 |
| 5,675,786 | 10/1997 | McKee et al. | 707/103 |
| 5,692,171 | 11/1997 | Andres | 707/2 |
| 5,692,176 | 11/1997 | Holt et al. | 707/5 |
| 5,694,593 | 12/1997 | Baclawski | 707/5 |
| 5,696,964 | 12/1997 | Cox et al. | 707/5 |
| 5,710,915 | 1/1998 | McElhiney | 707/3 |
| 5,826,261 | 10/1998 | Spencer | 707/5 |
| 5,920,854 | 7/1999 | Kirsch et al. | 707/3 |
| 5,963,944 | 10/1999 | Adams | 707/10 |

*Primary Examiner*—Paul V. Kulik
*Attorney, Agent, or Firm*—John J. Skinner, Jr.; Kenyon & Kenyon

[57] ABSTRACT

A method stores, indexes, searches and retrieves data information in a large data storage and retrieval system. Large amounts of data information, subject to searching and retrieval, are broken down and stored in sub-collections. Each sub-collection separately performs indexing of only the data information contained within that sub-collection and forms an inverted index. Statistical information derived from the inverted index of each sub-collection is collected by a global collection custodian and compiled into a global index. The global index is then passed to each sub-collection and is used by each during searching and retrieving of data information. Search results from each sub-collection are passed to the global collection custodian and organized there before being passed to a system user.

51 Claims, 3 Drawing Sheets

| TOTAL NUMBER OF DOCUMENTS IN SUB-COLLECTION | |
|---|---|
| $WORD_1$ | NUMBER OF DOCUMENTS IN SUB-COLLECTION THAT CONTAIN $WORD_1$ |
| $WORD_2$ | NUMBER OF DOCUMENTS IN SUB-COLLECTION THAT CONTAIN $WORD_2$ |
| ⋮ | ⋮ |
| $WORD_n$ | NUMBER OF DOCUMENTS IN SUB-COLLECTION THAT CONTAIN $WORD_n$ |

| TOTAL NUMBER OF DOCUMENTS IN ALL OF THE SUB-COLLECTIONS ||
|---|---|
| $WORD_1$ | TOTAL NUMBER OF DOCUMENTS THAT CONTAIN $WORD_1$ |
| $WORD_2$ | TOTAL NUMBER OF DOCUMENTS THAT CONTAIN $WORD_2$ |
| ⋮ | ⋮ |
| $WORD_n$ | TOTAL NUMBER OF DOCUMENTS THAT CONTAIN $WORD_n$ |

EFFICIENT AND EFFECTIVE DISTRIBUTED INFORMATION MANAGEMENT

PRIOR PROVISIONAL PATENT APPLICATION

The present application claims the benefit of U.S. Provisional Application No. 60/066,111 filed Nov. 19, 1997.

BACKGROUND OF THE INVENTION

1. Field of the Invention

The present invention relates to a method for storing and retrieving data from a large data text corpora, and more particularly, to a fault tolerant method of distributing, indexing and retrieving data information in a distributed data retrieval system.

2. Description of the Art

Data storage, indexing and retrieval from large databases becomes increasingly difficult as the databases become more extensive. When the amount of data that needs to be stored and searched exceeds certain limits, maintaining all of it as a single collection with a single index and searching that single index becomes inefficient, and is prone to failures. This is especially true in the case of the World Wide Web as the amount of data available on the Web is exponentially increasing each year. Currently available techniques for searching a database as extensive as the Web for a particular piece of data may yield incomplete results.

In an attempt to address data searching of ever increasing databases, many techniques have been developed. For example, U.S. Pat. No. 5,675,786, issued Oct. 7, 1997 to McKee et al., relates to accessing data held in large computer databases by sampling the initial result of a query of the database. Sampling of the initial result is achieved by setting a sampling rate which corresponds to the intended ratio at which the data records of the initial result are to be sampled. The sampling result is substantially smaller than the initial query result and is thus easier to analyze statistically. While this method decreases the amount of data sent as a result of the query to the end user, it still results in an initial search of what could be a massive database. Further, dependent upon the sampling rate, sampling may result in a reduction in the accuracy of the information sent to the end user and may thus not provide the intended result.

Another example, U.S. Pat. No. 5,642,502, issued Jun. 24, 1997 to Driscoll, relates to a method and system for searching and retrieving documents in a database. A first search and retrieval result is compiled on the basis of a query. Each word in both the query and the search result are given a weighted value, and then combined to produce a similarity value for each document. Each document is ranked according to the similarity value and the end user chooses documents from the ranking. On the basis of the documents chosen from the ranking, the original query is updated in a second search and a second group of documents is produced. The second group of documents is supposed to have the more relevant documents of the query closer to the top of the list. While more relevant documents may be found as a result of the second search, the patent does not address the problems associated with the searching of a large database and, in fact, might only compound them.

Yet another example, U.S. Pat. No. 5,265,244, issued Nov. 23, 1993 to Ghosh et al., relates to a method and apparatus for data access using a particular data structure. The structure has a plurality of data nodes, each for storing data, and a plurality of access nodes, each for pointing to another access node or a data node. Information, of a statistical nature, is associated with a subset of the access nodes and data nodes in which the statistical information is stored. Thus statistical information can be retrieved using statistical queries which isolate the subset of the access nodes and data nodes which contain the statistical information. While the patent may save time in terms of access to the statistical information, user access to the actual data records requires further procedures.

Thus, as can be seen, while attempts have been made to increase efficiency of data storage and retrieval, there still remains a need for an efficient and effective method of distributed information management in a large database.

SUMMARY OF THE INVENTION

Accordingly, the present invention is directed to providing a method of enabling effective and efficient storage, indexing, searching and retrieval of data information from a large data text corpora. Regardless of the size of the data text corpora, the present invention allows for data queries to be effectively and efficiently searched and the appropriate data information to be retrieved.

Large global collections of data are broken down into smaller sub-collections. The sub-collections can be stored independently one from the other, as in separate physical locations or simply in separate data tables within the same physical location, and can be connected one to the other through a network. As data are added to the large global collection overall, it can be sent and added to individual sub-collections and/or can be formed into a further sub-collection. For instance, data entered by educational institutions and scientific research facilities can be stored independently in their own data storage facilities and connected to one another via a network, such as the Internet. Thus, as can be seen, the present invention can be implemented with very little or no change in the present protocol for data collection and storage.

Once the individual sub-collections have been identified, each performs its own indexing function. In carrying out the indexing function, each sub-collection creates its own sub-collection view consisting of statistical information generated from what is commonly referred to as an inverted index. An inverted index is an index by individual words listing documents which contain each individual word. The indexing function itself can be carried out in any method. For example, indexing can be performed by assigning a weight to each word contained in a document. From the weights assigned to the words in each document, a sub-collection view (i.e., the statistical information derived from the inverted index) is created upon completion of the indexing function. Regardless of how the sub-collection indexing is carried out, each sub-collection will have its own independent sub-collection view based upon that sub-collection's inverted index. When data information is added to the sub-collection, the indexing function is carried out again and the sub-collection's view can be re-compiled from a new inverted index.

Upon completion of each sub-collection view, the sub-collection view is sent to and/or gathered by a global collection custodian. The global collection custodian may either request from each sub-collection that it send its sub-collection view, and/or each of the sub-collections may spontaneously send the sub-collection view to the global collection custodian upon completion. Regardless of whether the views are requested or spontaneously sent, upon collection at the global collection custodian of all of the sub-collection's views, the global collection custodian builds a "global view" on the basis of the sub-collection views. Necessarily, the global view is likely to be different from each of the individual sub-collection views. Once the global view has been compiled, it is sent back to each of the sub-collections.

In this manner then, a distributed data retrieval system is built and is ready for search and retrieval operations. To search for a particular piece of data information, a system user simply enters a search query. The search query is passed to each individual sub-collection and used by each individual sub-collection to perform a search function. In performing the search function, each sub-collection uses the global view to determine search results. In this manner then, search results across each of the sub-collections will be based upon the same search criteria (i.e., the global view).

The results of the search function are passed by each individual sub-collection to the global collection custodian, or the computer which initiated the search, and merged into a final global search result. The final global search result can then be presented to the system user as a complete search of all data information references.

The present invention, including its features and advantages, will become more apparent from the following detailed description with reference to the accompanying drawings.

DETAILED DESCRIPTION

FIGS. 1 through 6 show a method and an apparatus for the efficient and effective distribution, storage, indexing and retrieval of data information in a distributed data retrieval system which is fault tolerant. Large amounts of data may be searched and retrieved more readily and more accurately by distribution of the data, separate indexing of that distributed data, and creation of a global index on the basis of the separate indexes. A method and apparatus for accomplishing efficient and effective distributed information management will thus be shown below.

Figure 1:
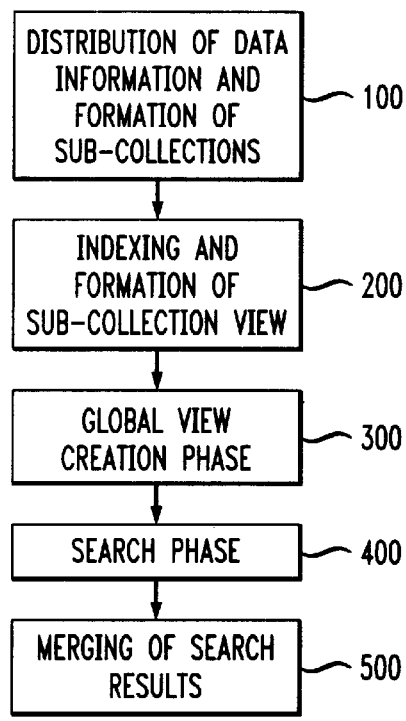
FIG. 1 illustrates a method of distributing, indexing and retrieving data in a distributed data retrieval system, according to an embodiment of the present invention.
Figure 2:
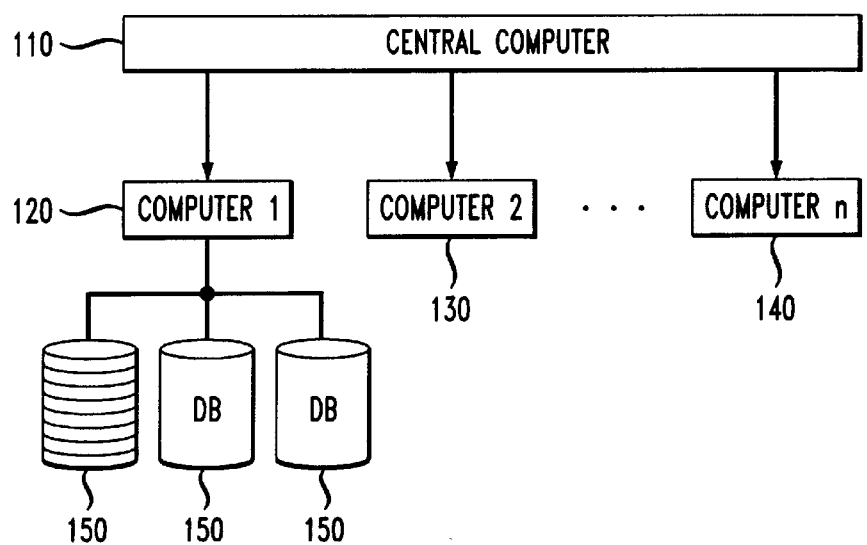
FIG. 2 illustrates the distribution of data information and the formation of sub-collections in a distributed data retrieval system, according to an embodiment of the present invention.

Referring to FIGS. 1 and 2, in step 100 of FIG. 1 data information is distributed and formulated into sub-collections 150 of FIG. 2. The process of distributing the data may be accomplished by sending the data from a central computer terminus 110 to local nodes 120, 130 and 140 of a computer network 10, or by directly entering the data at the local nodes 120, 130 and 140. Further, the data may be divided such that the divided data is of equal or unequal sizes, and so that each division of the data has a relational basis within that division (i.e., each division having an informational subject relation all its own). Such allowances for data entry and distribution allow for little or no change to current data entry and distribution protocols. In the case of the Web, data entry can continue as it does now. Each entity (i.e., Universities, Medical Research Facilities, Government Agencies, etc.) can continue to enter data as it sees fit. Thus, the sub-collections 150 can be organized in any fashion and be of any size. It is preferable, however, that the sub-collections be a manageable size for storage and retrieval, such as being less than 4 Gigabytes in size.

In step 200 of FIG. 1, the data information, which has been divided and stored into the sub-collections 150, is indexed and a "sub-collection view" is formed. Indexing of the sub-collection 150, like the step of distributing the data, can follow current protocols and may be computer-assisted or manually accomplished. It is to be understood, of course, that the present invention is not to be limited to a particular indexing technique or type of technique. For instance, the data may be subjected to a process of "tokenization". That is, documents containing the data are broken down into their constituent words. The resulting collection of words of each document is then subject to "stop-word removal", the removal of all function words such as "the", "of" and "an", as they are deemed useless for document retrieval. The remaining words are then subject to the process of "stemming". That is, various morphological forms of a word are condensed, or stemmed, to their root form (also called a "stem"). For example, all of the words "running", "run", "runner", "runs", . . . , etc., are stemmed to their base form run. Once all of the words in the document have been stemmed, each word can be assigned a numeric importance, or "weight". If a word occurs many times in the document, it is given a high importance. But if a document is long, all of its words get low importance. The culmination of the above steps of indexing convert a document into a list of weighted words or stems. These lists of weighted words or stems are thus in the form:

document$_i$→word$_1$, weight$_1$; word$_2$, weight$_2$; . . . ; word$_n$, weight$_n$.

Alternatively, the same indexing of the sub-collection can also be achieved using a bit-mapped indexing technique.

Figures 3, 4:
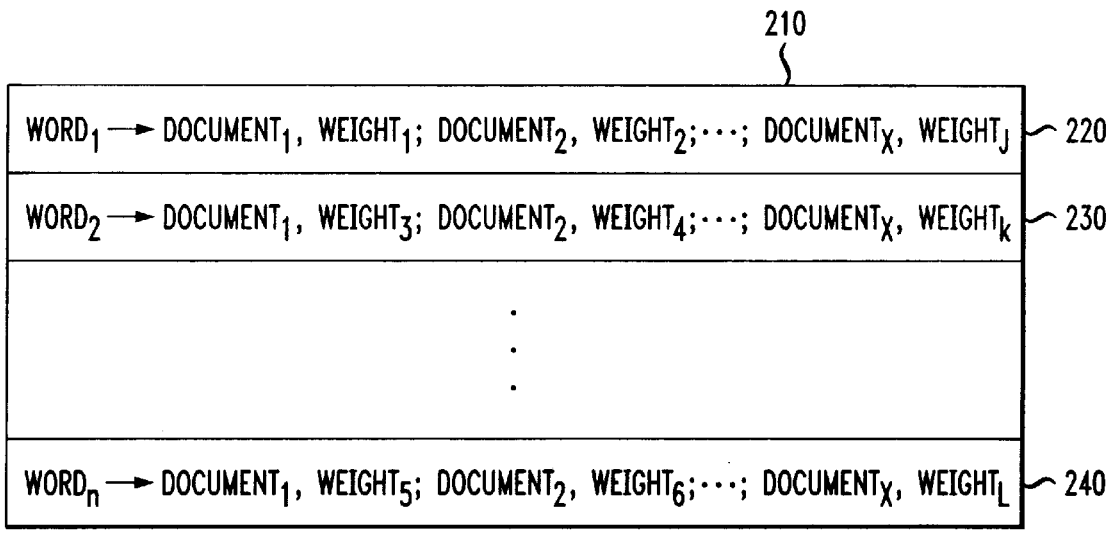
FIG. 3 illustrates an inverted index from which a sub-collection view can be generated in a distributed data retrieval system, according to an embodiment of the present invention.
FIG. 4 illustrates a sub-collection view, according to an embodiment of the present invention.

Regardless of the indexing technique used above, the index thus far created is then inverted and stored as an "inverted index", as shown in FIG. 3. Inversion of the index requires pulling each word or stem out of each of the documents of the index and creating an index based on the frequency of appearance of the words or stems in those documents. A weight is then assigned to each document on the basis of this frequency. Thus, the inverted index, has the form of:

word$_i$→document$_a$, weight$_a$; document$_b$, weight$_b$; . . . ; document$_z$, weight$_z$.

The inverted index 210 itself, as shown in FIG. 3, is composed of many inverted word indexes 220, 230 and 240, and can thus be created and organized. As shown, each inverted word index 220, 230 and 240 composes an index of a different word, taken from the documents of the initial index, such that each document is weighted in accordance with the frequency of appearance of the word in that document. Completion of the inverted index 210 allows the derivation of statistical information relating to each word and thus the creation of a sub-collection view 410, as shown in FIG. 4. The statistical information which makes up the sub-collection view 410 includes the total number of documents in the sub-collection 150 and, relating to each word, the number of documents in the sub-collection that contain that word. As each computer is indexing its sub-collection separately, the total indexing time for indexing the entire collection is greatly reduced as it is now shared across many computers. It is to be understood, of course, that any method of indexing may be used to form the sub-collection view 410 and that the above described method is but one of many for accomplishing that goal.

Figures 5, 6:
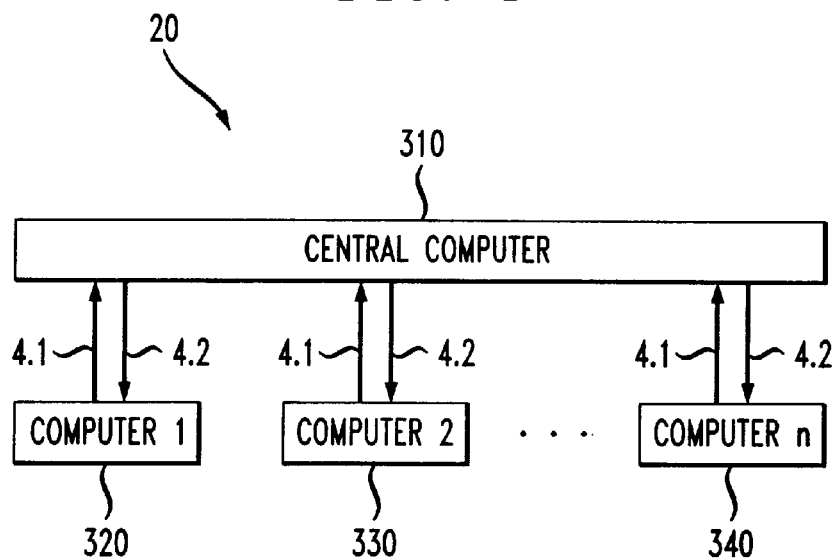
FIG. 5 illustrates the paths of communication forming a network between a central computer and a series of local computers in a distributed data retrieval system, according to an embodiment of the present invention.
FIG. 6 illustrates a Global View, according to an embodiment of the present invention.

In step 300 in FIG. 1, once the sub-collection view 410 is created, a "Global View" is created and distributed. For formation of the Global View, each sub-collection view 410 which has been created is collected from the local nodes 120, 130 and 140 of the computer network 10 and sent to the central computer 110. Referring to FIG. 5, showing an embodiment of the paths of communication of a computer network 20, sub-collection views from computers 320, 330 and 340 are sent to central computer 310 along communication paths 4.1. Collection and sending of the sub-collection view can be initiated by either the central computer 310 or the local computers 320, 330 and 340. If collection of the sub-collection views 410 is initiated by the central computer 310, it may be initiated by individual commands sent to each computer in the network 20, or as a group command sent to all of the computers in the network 20. If the collection of the sub-collection views 410 is initiated by the local computer 320, 330 or 340, then the local computer may send the sub-collection view upon occurrence of completion of the sub-collection view, an update of the sub-collection view, or some other criteria, such as a specific time period having elapsed, etc. It is to be understood, of course, that any method by which the completed sub-collection views are sent to the central computer from the local computers is acceptable.

Upon collection of all of the sub-collection views 410, a Global View 510 is created as shown in FIG. 6. In the formation of the Global View 510, the central computer 310 uses the sub-collections 410 that have been sent from every local computer 320, 330 and 340 to determine how many documents are contained in the sub-collection residing at the particular local computer, and for every word, how many documents in the sub-collection contain the word in question. The Global View 510 then comprises information pertaining to how many documents there are in all of the sub-collections (i.e., the total document sum) and for every word, how many documents in all of the sub-collections contain the word in question. The Global View, then, provides all of the necessary information for use in weighting the words in a user query, as will be explained below. It is to be understood, of course, that any method which provides the central computer with the information necessary to form the Global View may be used. For instance, the sub-collection views need not be sent in their entirety themselves, but instead the nodes could send only statistical information about their subcollection(s).

To complete step 300 of FIG. 1, the Global View 510 is sent from the central computer 310 to each of the local computers 320, 330 and 340 by way of communication paths 4.2 (as shown in FIG. 5). Thus each local node in the network will now have the Global View. It is to be understood, of course, that the description of the formation of the sub-collection views and subsequent formation of the Global View can be conducted on any computer network, and thus computer networks 10 and 20 are to be considered interchangeable in this description.

In step 400 of FIG. 1, the search phase is conducted. The search phase refers to search and retrieval of data information stored in the large data text corpora. Thus, to begin with, in the search phase a search query is entered and uploaded by a system user into the computer network 10. It is to be understood, of course, that the system user may enter the search query at any computer location that is connected to the computer network 10. Upon entry of the search query, the search query is transmitted by the computer network 10 to all of the local computers 120, 130 and 140 in the computer network 10.

After receiving the search query, each local computer 120, 130 and 140 then indexes the search query using the same steps that are used to index the documents, namely, for instance, "tokenization", "stop word removal" and "stemming" and "weighting". The resulting words (actually stems) in the query are assigned importance weights using the Global View 510 which each local computer 120, 130 and 140 received in step 300. If a query word is used in many documents, then it is presumed to be common and is assigned a low importance weight. However, if a handful of documents use a query word, it is considered uncommon and is assigned a high importance weight. For example, one of the formulae used to predict the importance of a word and thus assign each query word a numeric weight is:

number of occurrences of the word in the query ×

$$\log\left(\frac{\text{total number of documents in the collection}}{\text{number of documents that use the given word}}\right).$$

The "total number of documents in the collection" and the "number of documents that use the given word" statistics are only available to local computers 120, 130 and 140 after the Global View creation.

It is to be noted, of course, that other formulae might be used as desired. If so, the sub-collection view may be adjusted to account for the different formula. It should also be noted that having each local computer perform an indexing of the search query might be necessary if the entry point of the search query is at a point which does not have access to the Global View and thus cannot perform the indexing function. However, if the entry point for the search query does have access to the Global View, then the search query can be indexed at the entry point and distributed in an indexed format.

The indexing of the search query, as shown above, yields a weighted vector for the search query of the form:

query→word$_1$, weight$_1$; word$_2$, weight$_2$; . . . ; word$_n$, weight$_n$.

Having indexed the search query, a simple formula is used to assign a numeric score to every document retrieved in response to the search query. This simple formula, referred to as a "vector inner-product similarity" formula can be as follows:

$$\text{document score} = \sum_{i=1}^{n} \text{weight}_{i,Query} \times \text{weight}_{i,Doc}$$

where weight$_{i,Query}$ is the weight of word$_i$ in the search query and weight$_{i,Doc}$ is the weight of wordi in the document being scored. Each document is then sent to the central computer 310, via communication paths 4.1, from the local computer nodes 320, 330 and 340.

In step 500 of FIG. 1, once all search results have been returned to the central computer via communication paths 4.1, the central computer 310 merges the variously retrieved documents into a list by comparing the numeric scores for each of the documents. The scores can simply be compared one against the other and merged into a single list of retrieved documents because each of the local computers 320, 330 and 340 used the same Global View 510 for their search process. Upon completion of the merging of the documents, a complete list is presented to the system user. How many of the documents are returned to the user can, of course, be pre-set according to user or system criteria. In this manner then, only the documents most likely to be useful, determined as a result of the system user's search query entered, are presented to the system user.

It should be noted that the manner in which the Global View 510 is created provides a fault tolerant method of distributing, indexing and retrieving of data information in the distributed data retrieval system. That is, in the case where one or more of the sub-collection views is unable to be collected by the central computer, for whatever reason, a search and retrieval operation can still be conducted by the user. Only a small portion of the entire collection is not searched and retrieved. This is because failure by one or more local computers results in only the loss of the sub-collections associated with those computers. The rest of the data text corpora collection is still searchable as it resides on different computers.

Further, to provide even more fault tolerance, data information may be duplicatively stored in more than one sub-collection. Duplicative storage of the data information will protect against not including that data information in a search and retrieval operation if one of the sub-collections in which the data information is stored is unable to participate in the search and retrieval.

Thus the foregoing embodiment of the method and apparatus show that efficient and effective management of distributed information can be accomplished. The current invention of the division of the large data text corpora into sub-collections which are then separately indexed, which indexes are then used to form a global view, is possible, as shown herein, without a loss and, in fact, an increase in the effectiveness and efficiency of a search and retrieve system. Further, the search and retrieval operations take less time than current systems which either search the entire large collection all at once or which search individual collections.

In the foregoing description, the method and apparatus of the present invention have been described with reference to a specific example. It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method of data storage and retrieval from a large data text corpora, comprising the steps of:
    forming at least one sub-collection from the large data text corpora;
    indexing the at least one sub-collection to form at least one sub-collection view;
    creating a global view on the basis of the at least one sub-collection view;
    indexing a search query using the global view;
    searching, in response to the search query, the at least one sub-collection using the global view; and
    merging at least one result retrieved from the search of the at least one sub-collection.

2. The method according to claim 1, further comprising the step of:
    distributing a plurality of data from the large data text corpora to at least one data storage site.

3. The method according to claim 1, wherein the large data text corpora is contained in a computer network.

4. The method according to claim 3, wherein the computer network comprises a central computer and at least one local computer node.

5. The method according to claim 2, wherein the at least one data storage site is a local computer node of a computer network.

6. The method according to claim 1, wherein the formation of the at least one sub-collection is accomplished using an information topic relationship.

7. The method according to claim 1, wherein the step of indexing the at least one sub-collection to form at least one sub-collection view further comprises the steps of:
    subjecting the plurality of data contained in the sub-collection to tokenization to form a collection of words;
    removing at least one stop-word from the collection of words;
    stemming the collection of words to create a collection of stems;
    assigning weights to the collection of stems;
    creating at least one inverted index from the collection of stems; and
    forming the sub-collection view on the basis of the at least one inverted index.

8. The method according to claim 1, wherein the sub-collection view comprises a plurality of statistical data derived from the at least one inverted index.

9. The method according to claim 1, wherein the step of creating a global view on the basis of the at least one sub-collection view further comprises the steps of:
    determining a total number of documents which are contained in the sub-collection view; and
    determining a number of documents which contain each individual word in the sub-collection view.

10. The method according to claim 1, wherein the step of creating a global view on the basis of the at least one sub-collection view further comprises the steps of:
    sending the at least one sub-collection view to a global collection custodian; and
    relaying the global view from the global collection custodian to the at least one sub-collection.

11. The method according to claim 1, further comprising the step of:
    entering a search query containing at least one search term.

12. The method according to claim 1, wherein the step of merging the results retrieved from the search of the at least one sub-collection further comprises the steps of:
    comparing a plurality of numeric scores for the results retrieved; and
    creating a list on the basis of the comparison of the plurality of numeric scores.

13. The method according to claim 1, further comprising the step of:
    presenting the at least one search result to a system user.

14. A method of distributing, storing, indexing, searching and retrieving data information in a data storage and retrieval system, comprising the steps of:
    forming at least one sub-collection from a plurality of data in the data storage and retrieval system;

indexing the at least one sub-collection to form at least one inverted index;

creating at least one sub-collection view on the basis of the at least one inverted index;

creating a global view using the at least one sub-collection view;

searching the at least one sub-collection using the global view; and forming a search result from the step of searching the at least one sub-collection.

15. The method according to claim 14, further comprising the step of:

distributing a plurality of data in the data storage and retrieval system.

16. The method according to claim 14, wherein the data storage and retrieval system comprises a central computer and at least one local computer node connected to the central computer.

17. The method according to claim 14, wherein the formation of the at least one sub-collection is accomplished using an information topic relationship.

18. The method according to claim 14, wherein the step of indexing the at least one sub-collection to form at least one inverted index further comprises the steps of:

subjecting the plurality of data contained in the sub-collection to tokenization to form a collection of words;

removing at least one stop-word from the collection of words;

stemming the collection of words to create a collection of stems;

assigning weights to the collection of stems; and creating an inverted index from the collection of stems.

19. The method according to claim 14, wherein the step of creating a global view using the at least one sub-collection view further comprises the steps of:

determining a total number of documents which are contained in the sub-collection view; and determining a number of documents which contain each individual word in the sub-collection view.

20. The method according to claim 14, wherein the step of creating a global view using the at least one sub-collection view further comprises the steps of:

sending the at least one sub-collection view to a global collection custodian; and relaying the global view from the global collection custodian to the at least one sub-collection.

21. The method according to claim 14, further comprising the step of:

entering a search query containing at least one search parameter.

22. The method according to claim 14, wherein the step of forming a search result further comprises the step of:

comparing a plurality of numeric scores for the results retrieved; and creating a list on the basis of the comparison of the plurality of numeric scores.

23. The method according to claim 14, further comprising the step of:

presenting the search result to a system user.

24. A method of data retrieval, comprising the steps of:

forming at least one sub-collection from a distribution of a plurality of data;

creating at least one sub-collection view of the at least one sub-collection;

creating a global view from the at least one sub-collection view;

searching the at least one sub-collection using the global view; and retrieving a search result from the step of searching.

25. The method according to claim 24, wherein the distribution of the plurality of data is over a computer network.

26. The method according to claim 25, wherein the computer network comprises a central computer and at least one local computer node.

27. The method according to claim 24, further comprising the step of:

storing the sub-collection at a local computer node of a computer network.

28. The method according to claim 24, wherein the step of creating at least one sub-collection view of the at least one sub-collection further comprises the step of:

indexing the at least one sub-collection; and creating the sub-collection view on the basis of at least one inverted index.

29. The method according to claim 28, wherein the step of indexing the at least one sub-collection further comprises the steps of:

subjecting the plurality of data contained in the sub-collection to tokenization to form a collection of words;

removing at least one stop-word from the collection of words;

stemming the collection of words to create a collection of stems;

assigning weights to the collection of stems; and creating at least one inverted index from the collection of stems.

30. The method according to claim 24, wherein the sub-collection view is comprised of a plurality of statistical data derived from the at least one inverted index.

31. The method according to claim 24, wherein the step of creating a global view from the at least one sub-collection view further comprises the steps of:

determining a total number of documents which are contained in the sub-collection view; and determining a number of documents which contain each individual word in the sub-collection view.

32. The method according to claim 24, wherein the step of creating a global view from the at least one sub-collection view further comprises the steps of:

sending the at least one sub-collection view to a global collection custodian; and relaying the global view from the global collection custodian to the at least one sub-collection.

33. The method according to claim 24, further comprising the step of:

entering a search query containing at least one search term.

34. The method according to claim 24, wherein the step of retrieving a search result comprises the steps of:

comparing a plurality of numeric scores for the results retrieved; and creating a list on the basis of the comparison of the plurality of numeric scores.

35. The method according to claim 24, further comprising the step of:

presenting the search result to a system user.

36. A method of data retrieval, comprising the steps of:

creating a global view from at least one sub-collection view;

distributing the global view to at least one sub-collection; and searching the at least one sub-collection.

37. The method according to claim 36, wherein the step of creating a global view from at least one sub-collection view further comprises the steps of:

determining a total number of documents which are contained in the at least one sub-collection view; and determining a number of documents which contain each individual word in the at least one sub-collection view.

38. The method according to claim 36, wherein the step of creating a global view using the at least one sub-collection view further comprises the step of:

sending the at least one sub-collection view to a global collection custodian.

39. The method according to claim 36, further comprising the step of:

entering a search query containing at least one search parameter.

40. The method according to claim 36, wherein the step of searching the at least one sub-collection is based on a search query.

41. The method according to claim 36, further comprising the step of:

presenting a search result to a system user.

42. An apparatus for data storage in and retrieval from a large data text corpora, comprising:

at least one data storage that stores at least one sub-collection of the large data text corpora;

at least one local computer node, at which the at least one data storage is located, capable of creating at least one sub-collection view;

a central computer that can communicate with said local computer node and can create a global view on the basis of the at least one sub-collection view from said local computer node, wherein the global view is used in the data retrieval.

43. The apparatus according to claim 42, wherein distribution of the large data text corpora is accomplished by one of entering a plurality of data information at the at least one local computer node and the central computer.

44. The apparatus according to claim 42, wherein the at least one local computer node and the central computer each further comprise:

a means for entry of a plurality of data to be added to the large data text corpora.

45. The apparatus according to claim 42, wherein the sub-collection view includes at least one inverted index.

46. An apparatus for data retrieval, comprising:

at least one sub-collection of a plurality of data;

a means for creating at least one sub-collection view from the at least one sub-collection; and a means for creating a global view from the at least one sub-collection view; and a means for searching the plurality of data using the global view, which search results are then retrieved.

47. The apparatus according to claim 46, further comprising:

a means for adding additional data to the plurality of data.

48. The apparatus according to claim 46, wherein the means for creating at least one sub-collection view from the at least one sub-collection comprises:

an index created according to a process of indexing the sub-collection; and an inverted index created from the index.

49. The apparatus according to claim 46, wherein the means for creating a global view from the at least one sub-collection view comprises:

at least one local computer node in which the at least one sub-collection is stored;

a central computer; and a means for communication between the at least one local computer node and the central computer.

50. An apparatus for data retrieval, comprising:

at least one sub-collection of data;

at least one sub-collection view of the at least one sub-collection;

a global view created on the basis of the at least one sub-collection view; and a means for conducting data retrieval on the basis of the global view.

51. The apparatus according to claim 50, wherein the means for conducting data retrieval on the basis of the global view comprises:

a search query comprising at least one search parameter.

* * * * *